Aug. 27, 1946.  W. J. O'BRIEN  2,406,396

EQUI-SIGNAL RADIO BEACON SYSTEM

Filed March 2, 1942  2 Sheets-Sheet 1

WILLIAM J. O'BRIEN,
INVENTOR

BY
ATTORNEY.

Aug. 27, 1946.  W. J. O'BRIEN  2,406,396
EQUI-SIGNAL RADIO BEACON SYSTEM
Filed March 2, 1942  2 Sheets-Sheet 2
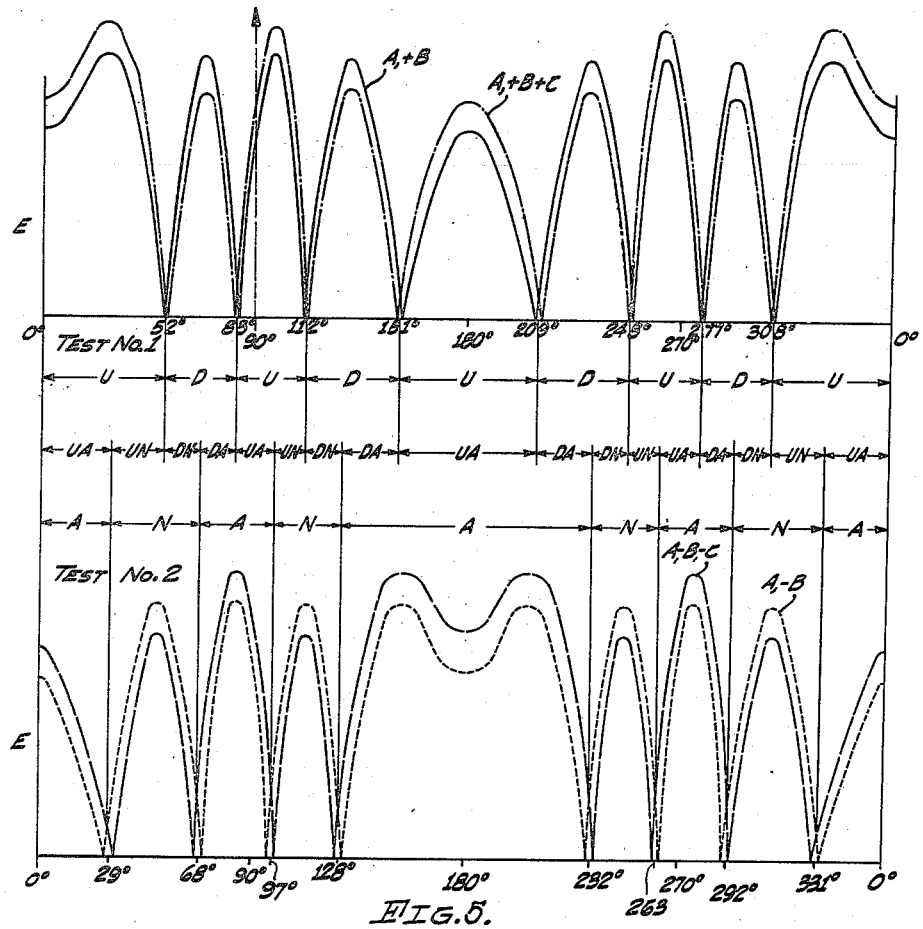
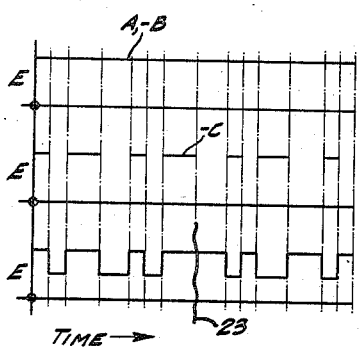
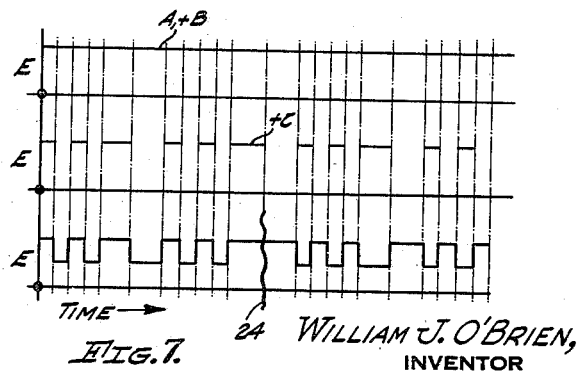
WILLIAM J. O'BRIEN,
INVENTOR
BY
ATTORNEY.

Patented Aug. 27, 1946

2,406,396

UNITED STATES PATENT OFFICE 2,406,396

EQUISIGNAL RADIO BEACON SYSTEM

William J. O'Brien, Los Angeles, Calif., assignor to The Decca Record Company, Limited, London, England, a corporation of Great Britain Application March 2, 1942, Serial No. 432,948

4 Claims. (Cl. 250—11)

My invention relates to a radio beacon system and has particular reference to an equi-signal size type of radio beacon which finds particular utility when employed as a navigation aid for vehicles and conveyances, particularly aircraft.

The equi-signal type of radio beacon system is that which is at present employed in the United States Department of Commerce airways radio-range beacon for establishing the transcontinental air routes followed by the commercial air transport companies. This type of system generally comprises a group of radio transmission antennae so arranged and so operated that the course along which it is desired to navigate an aircraft comprises the locus of points of equal signal intensities as regards separate signals of like frequency emanated from the antennae. In general, these separate signals are reciprocally and distinguishably keyed "off" and "on," the conventional arrangement being that in which one signal is keyed with the International Morse code character for A (. —) while the other is alternately keyed N (— .). If the aircraft is "on course" the intensities of the two signals are equal and the off periods of one coincide with the on periods of the other so that a steady and continuous signal is received. If the plane is "off course," one of the signals will predominate over the other and the keying of the signals will be apparent. The direction in which the plane has drifted from the course is indicated by whether the A or N signal predominates.

The present systems while of great assistance in the navigation of aircraft, nevertheless are characterized by certain disadvantages and difficulties. For example, the present systems are usually so arranged that they define four courses radiating outwardly from the antenna system at substantially right angles to each other. If for any reason an aircraft pilot were to wander far enough off course to be lost, he must then fly in a spiral course or other similar course calculated to carry him across one of the courses established by the beacon. Having found such a course he still has no way of readily ascertaining which of the four courses it is and must then fly many miles of test maneuvers to identify the courses and find the course he is supposed to be following. Tests have shown that the average pilot when flying blind and intentionally lost requires about an hour to get on to a given course.

This problem arises not infrequently and usually occurs at a time the aircraft is flown over the beacon transmitters. The resulting loss of time and particularly the loss of gasoline hours frequently places the lives and safety of the passengers in great danger.

The present systems do not provide a sufficiently sensitive indication to permit their successful application to long range control, as for example, the guiding of bombing planes in war time to an objective to be bombed situated five or six hundred miles distant. The sensitivity of the present system can be increased by increasing the antenna spacing. There are, however, practical limitations on how far apart the antennae may be successfully spaced and, furthermore, an increase in antenna spacing likewise increases the number of equi-signal courses produced so that the danger of an aircraft becoming lost through inability to identify the course is correspondingly increased.

It is, therefore, an object of my invention to provide an equi-signal type of radio beacon system which overcomes the above noted disadvantages by providing for increased sensitivity of indication.

It is also an object of my invention to provide a radio beacon system of the character set forth in the preceding paragraph which includes a means for transmitting course identifying signals at predetermined intervals and arranged to positively identify and distinguish each of a plurality of courses.

Other objects and advantages of my invention will be apparent from a study of the following specification, read in connection with the accompanying drawings, wherein.

Fig. 5 is a diagrammatic view comprising two sets of curves drawn on rectangular coordinates and illustrating the field patterns produced when radiation from a centrally positioned antenna is introduced in addition to the radiation from the two antennae previously referred to. Fig. 5 illustrates also the manner in which the radiation introduced from the central antenna may be employed to positively identify the various equi-signal courses which are indicated in Fig. 1;

Fig. 6 is a diagrammatic view illustrating the mode of operation of the three antennae for producing one set of course identifying signals; and Fig. 7 is a diagram similar to Fig. 6 but illustrating the manner in which the antennae are operated to produce a second set of course identifying signals.

Figure 1:
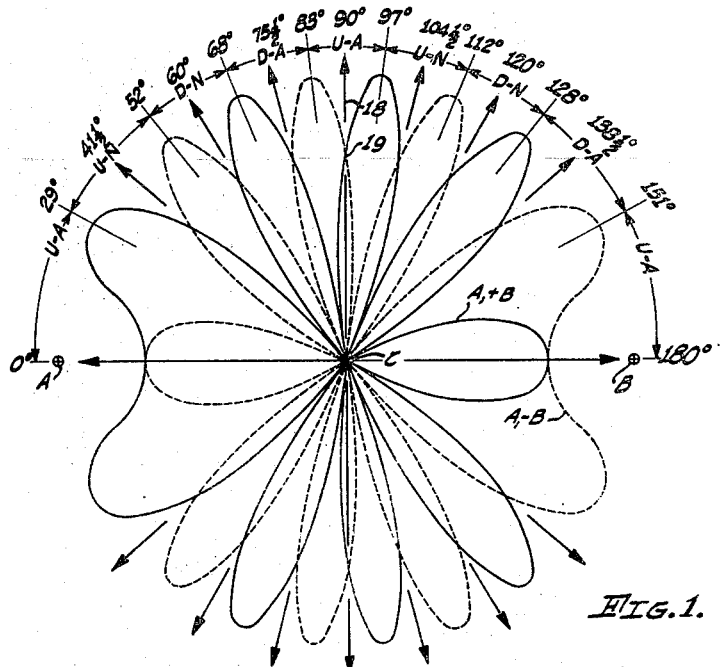
Fig. 1 is a polar diagram illustrating the signal intensities which are produced by two radio antennae, one operating continually and the other being so operated as to produce a recurring phase reversal.

Referring to the drawings, I have illustrated in Fig. 1 two radio transmission antennae A and B as being spaced from each other a known distance. Fig. 1 illustrates by means of the solid line curve A+B the field pattern which is produced when the antennae A and B are spaced apart a distance corresponding to two wavelengths and are operated as illustrated in Fig. 3 wherein antenna A is illustrated as being continuously operated, whereas, antenna B is so operated as to produce a cyclic 180° phase reversal.

Figure 3:
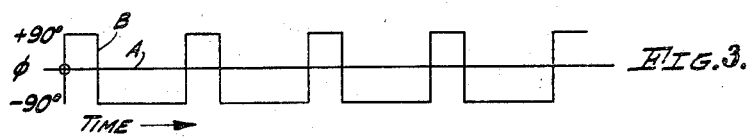
Fig. 3 is a diagrammatic view illustrating the mode of operation of the two antennae A and B.

As is shown in Fig. 3, this cycle is so arranged that the signal from antenna B leads the A signal by 90 electrical degrees for a relatively short period of time and then lags the A signal by 90 electrical degrees for a period of time substantially three times as long as the period in which it leads the A signal.

Figure 2:
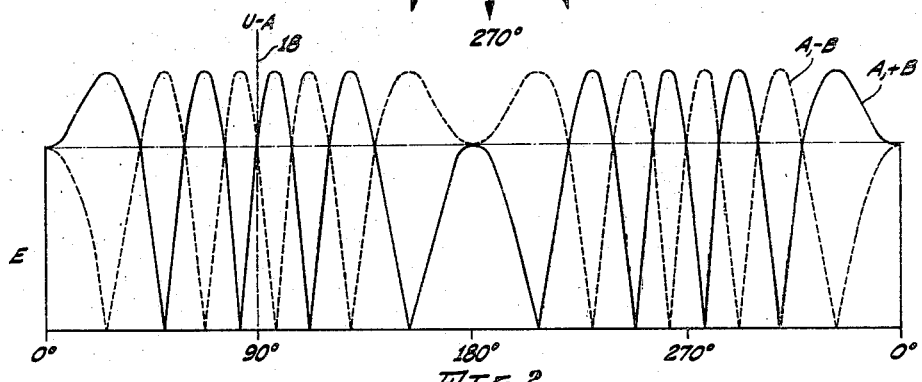
Fig. 2 is a diagram drawn on rectangular coordinates and reproducing the same relationships as are illustrated in the polar diagram of Fig. 1.

Figs. 1 and 2 each represent the field strength pattern produced by this mode of operation of the antennae A and B, Fig. 1 comprising a polar diagram of the field strength patterns, while Fig. 2 illustrates precisely the same patterns drawn on rectangular coordinates in which the relative intensities of the signals are plotted as ordinates and the angular position of the vehicle with respect to a given reference direction is plotted as abscissa.

The solid line curve in Figs. 1 and 2 identified by the reference character A+B represents the field strength pattern produced by the operation of antennae A and B during the time the B signal leads the A signal by 90°. The dotted line identified by the reference character A—B illustrates the field pattern produced during the time the B signal lags the A signal by 90°.

By so operating the antennae A and B, sixteen equi-signal courses are defined. These courses are indicated by the various radially disposed arrows shown on Fig. 1. If zero degrees is defined as the line extending from a point midway between antennae A and B and through antenna A, then the various equi-signal courses defined by this beacon system lie, respectively, at 0°, 41½°, 60°, 75½° 90°, 104½°, 120° and 138½°, with the remaining eight similarly positioned about the remaining semi-circle.

Each of these courses comprises a radial line extending from the origin through a point of intersection of the A+B field pattern with the A—B field pattern. For example, the 90° course indicated by the arrow 18 is defined by a line extending from the origin through the point of intersection identified by the reference character 19.

Figure 4:
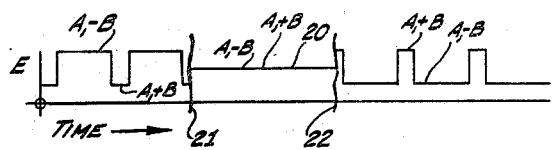
Fig. 4 is a diagram illustrating the manner in which the operation of the antennae A and B as indicated by Fig. 3 serves to provide an indication of the location of a vehicle with respect to the course intended to be followed by that vehicle.

If a vehicle which is provided with suitable receiving apparatus proceeds along the 90° course, the signal received will comprise a steady tone such as that indicated by the straight horizontal line 20 in that portion of Fig. 4 which lies between the wavy break lines 21 and 22. If the aircraft wanders to the left of the 90° course, it will be noted that the A—B signal will predominate in intensity over the A+B signal so that there is produced a relative signal intensity such as that illustrated in Fig. 4 in that portion lying to the left of the wavy break line 21. It will be noted that the A—B signals have a duration roughly three times as long as the duration of the A+B signals so that the pilot obtains the impression of hearing a series of spaced dashes.

Similarly, if the vehicle wanders to the right of the 90° course, the A+B signals will predominate over the A—B signals so as to produce the impression of receiving a series of spaced dot signals. Thus the pilot will be apprised of whether or not he is following the 90° course or whether he has wandered either to the right or to the left of such course.

It will be appreciated from an inspection of Fig. 1 that it would be relatively easy for a pilot to wander from the desired course a distance sufficient to cause his erroneous course to lie along an adjacent equi-signal course. Under these circumstances it is highly desirable that some means be provided for identifying the various courses so that the pilot may know at all times which of the various equi-signal courses is being followed.

I propose to accomplish this desirable result by periodically introducing radiation from a centrally positioned antenna such as antenna C illustrated in Fig. 1. This may be accomplished by interrupting the normal operation of antenna B so that antennae A and B are continuously operated and by introducing a variable or controlled radiation from antenna C. Antenna B may then be shifted to its second mode of operation and antenna C may again be operated in a predetermined fashion. The result is to produce signals which can be readily interpreted by the pilot of the vehicle and which when interpreted will provide him with a definite indication as to which of the equi-signal courses is followed.

I have illustrated in Figs. 6 and 7 the preferred mode of operation of the antennae A, B and C to produce this desirable result. It is intended that antenna C be operated a short time, say for ten seconds, out of each minute of normal operation of antennae A and B. During the normal operation of antennae A and B the position of the aircraft with respect to the equi-signal course will be indicated as previously described. At the conclusion of the first period of normal operation, antenna A is operated continuously and antenna B is likewise continuously operated in such manner that the B signals lag the A signals by 90 electrical degrees. During this period antenna C is so operated as to produce an intermittent signal which lags the A signal by 45°. The intermittent operation of antenna C is such that the "on" periods define the International Morse code signal for A; namely, a dot followed by a dash. This signal is repeated at regular and frequent intervals over a period of perhaps five or ten seconds. This mode of operation is illustrated in Fig. 6 wherein the upper portion of the figure indicates the mode of operation of antennae A and B, whereas, the central portion of the figure illustrates the keying of antenna C.

The result of this type of operation is illustrated in Fig. 5 and particularly in the lower field intensity curve comprising a portion of this figure. The dotted line bearing the reference character A—B corresponds to the dotted line bearing the same reference character shown in Figs. 1 and 2 and represents the field strength pattern produced by the continuous operation of antennae A and B with the B signals lagging the A signals by 90°. The dashed line bearing the reference character A—B—C represents the field strength pattern produced during the periods in which the antenna C is energized as above described.

It will be noted that the A—B—C signal predominates over the A—B signals in those zones lying between 68° and 97°, 128° and 232°, 263° and 292° and 331° and 29°, whereas, in the intermediately positioned areas the A—B signals predominate over the A—B—C signals. Thus a pilot flying in that sector-shaped area lying between 68° and 97° will, during the identification period, receive signals wherein the A—B—C signals predominate over the A—B signals.

Such a condition is illustrated in the lower portion of Fig. 6 and in that part lying to the left of the wavy break line 23. The periods of greatest signal intensity correspond precisely to the keying of antenna C so that the pilot hears a signal comprising a repetition of the International Morse code character for A, thus identifying his location as being between 68° and 97°. If, on the other hand, the vehicle is positioned to the left of the 68° line or to the right of the 97° line, the signal received will be one in which the A—B signals predominate over the A—B—C signals, such condition being illustrated in the lower portion of Fig. 12 to the right of the wavy break line 23.

It will be noted that the periods of signal predominance correspond to the periods in which the antenna C is de-energized, with the result that there is produced a signal comprising the negative of the International Morse code signals for A and, in fact, comprising the International Morse code signal for N. The dimension lines appearing immediately above the lowermost curve of Fig. 5 identify the various areas with the A and N signals which are heard by the pilot if his vehicle is positioned in these areas.

Immediately following the above described operation of antenna C, the mode of operation of antennae A and B is so changed that they are continuously operated with the signals emanating from antenna B leading the signals emanating from antenna A by 90°. During this portion of the identifying period antenna C is intermittently operated in such fashion that its signals lead the A signals by 45 electrical degrees and the intermittent operation is such that the signals emanating from antenna C define the International Morse code character for U.

This mode of operation of the three antennae is illustrated in Fig. 7 wherein the uppermost portion of the figure illustrates the steady and continuous operation of antennae A and B while the central portion of the figure illustrates the manner in which antenna C is keyed "off" and "on."

The field strength patterns resulting from this mode of operation of antennae A, B and C is illustrated in the uppermost curves of Fig. 5 wherein the solid line curve bearing the reference character A+B corresponds to the field strength pattern produced by the operation of antennae A and B with the B signals leading the A signals by 90°. This curve corresponds precisely to the solid line curves of Figs. 1 and 2. The dot-dash curve of Fig. 5 bearing the reference character A+B+C illustrates the field pattern produced when the three antennae are simultaneously operated as described in the preceding paragraph.

It will be noted that the A+B signal predominates over the A+B+C signal in the areas lying between 52° and 83°, 112° and 151°, 209° and 248°, and 277° and 308°, while the A+B+C signal predominates over the A+B signal in the remaining areas. Thus a pilot whose vehicle is positioned somewhere in the sector-shaped area bounded by the 83° and 112° lines will receive signals in which the A+B+C signals predominate over the A+B signals. Such received signals are indicated by the lower portion of Fig. 7 in that portion lying to the left of the wavy break line 24.

It will be noted that the periodicity of the predominating signal corresponds exactly to the keying of C antenna so that the pilot hears an audible signal comprising the International Morse code character for U. On the other hand, if the vehicle is positioned either to the right or the left of the area bounded by the 83° and 112° lines, the A+B signals will predominate over the A+B+C signals, with the result that the signal heard by the pilot is that represented by the lower portion of Fig. 7 lying to the right of the wavy break line 24.

It will be noted that the periodicity of the predominating signal is the reciprocal of the periodicity of the keying of the C antenna and so defines the International Morse code character for D; namely, a dash followed by two dots. The various areas identified during this portion of the identification period by the U and D signals are indicated by appropriate dimension lines positioned immediately below the uppermost curves of Fig. 5.

By comparing the U and D dimension lines with the previously mentioned A and N dimension lines, it will be noted that if the vehicle is disposed between the 83° line and the 97° line, the pilot thereof will hear an A signal during the first part of the identification period and this will be followed by a U signal during the second part of the identification period, thus clearly designating the 90° equi-signal course 18 as the "UA" course.

It will be noted that if the vehicle has wandered to the left of the 83° line, the A signal will still be first heard during the identification period but this A signal will be followed by a D signal, thus apprising the pilot that his location is adjacent the "DA" course rather than the "UA" course.

Similarly, if his position is to the right of the 97° line, the first signal heard during the identification period will be an N signal and this will be followed by a U signal so as to apprise the pilot that he is adjacent the "UN" course rather than the desired "UA" course.

I have indicated by suitable legends and dimension lines positioned midway between the two curves of Fig. 5 the various sector-shaped areas and the corresponding identifying letters. The same mode of identification has been employed in Fig. 1.

An inspection of Fig. 5 will indicate that while this particular form of beacon system of my invention operates to produce sixteen separate and distinct equi-signal courses, yet there is provided four different and distinguishable identifying characters for the sixteen courses so that in order for a pilot to become lost it would be necessary for him to wander a very great distance from the selected course. It will be noted that the possibility of a pilot becoming lost on this sixteen course beacon system with its identifying signals is no greater than the chances of becoming lost on the conventional four course beacon system. This mode of course identification may likewise, of course, be used with a four course type of beacon system, in which event it would be impossible for a pilot to become lost; that is, to be flying along one course under the impression that he is flying an entirely different course.

Attention is directed to the fact also that the beacon system illustrated in Figs. 1 through 7 above described provides an extremely acute angle at the intersection of the alternate field pattern which serves to establish the courses so that a relatively slight deviation of the vehicle from the selected course serves to produce a strong "off course" indication, thus permitting the pilot to guide the vehicle with extreme accuracy along the selected course.

In the foregoing, I have illustrated and described an improved form of equi-signal radio beacon system which operates to produce an indication of the location of the vehicle with respect to one course selected from a plurality of available courses. It will be observed that the sensitivity of indication which is provided is extremely high so that a pilot may guide his vehicle along the selected course with great accuracy.

I have also disclosed a modification of my invention which provides for the positive identification of a plurality of separate courses defined by a single radio beacon system so as to avoid the presently encountered difficulty of a pilot of a vehicle being lost in that though he may be proceeding along an equi-signal course, he has no way of knowing whether he is proceeding along the desired course or another course leading him far from his selected destination.

While I have shown and described the preferred embodiment of my invention, I do not desire to be limited to any of the details of construction shown or described herein, except as defined in the appended claims.

I claim:

1. In a radio beacon system for producing a plurality of radio frequency equi-signal surfaces by radiating from spaced points radio frequency signals of a given frequency and by periodically changing the phase relation of said signals from said one relation to another, the method of identifying the surfaces so produced which consists in radiating from a centrally positioned point radio frequency signals having said given frequency and bearing a predetermined phase relation to the signal radiated from one of said spaced points, and distinguishably keying off and on the signal radiated from said central point while maintaining fixed the phase relation between the signals radiated from said spaced points.

2. In a radio beacon system for producing a plurality of radio frequency equi-signal surfaces by radiating from spaced points radio frequency signals of a given frequency and by periodically changing the phase relation of said signals from said one relation to another, the method of identifying the surfaces so produced which consists in radiating from a centrally positioned point radio frequency signals having said given frequency and bearing a predetermined phase relation to the signal radiated from one of said spaced points, distinguishably keying off and on in a predetermined sequence the signal radiated from said central point while maintaining said one phase relation between the signals radiated from said spaced points, thereafter radiating from said central point radio frequency signals having said given frequency and bearing a different predetermined phase relation to the signal radiated from said one of said spaced points, and distinguishably keying off and on in a different predetermined sequence the signal radiated from said central point while maintaining said other phase relation between the signals radiated from said spaced points.

3. In a radio beacon system for producing a plurality of radio equi-signal guiding surfaces, the method of identifying said equi-signal surfaces which consists in periodically modifying the operation of said system to produce a plurality of indicating radio frequency equi-signal surfaces displaced in orientation with respect to said guiding equi-signal surfaces, and distinguishably keying off and on the radiated signals to permit distinguishing said indicating equi-signal surfaces from said guiding equi-signal surfaces.

4. In a radio beacon system for producing a plurality of radio equi-signal guiding surfaces, the method of identifying said equi-signal surfaces which consists in periodically modifying the operation of said system to produce a plurality of first indicating radio frequency equi-signal surfaces displaced in orientation with respect to said guiding equi-signal surfaces, distinguishably keying off and on by one mode the radiated signals to permit distinguishing said first indicating equi-signal surfaces, subsequently modifying the operation of said system to produce a plurality of second indicating radio frequency equi-signal surfaces displaced in orientation with respect to said first indicating surfaces and with respect to said guiding surfaces, and distinguishably keying off and on by another mode the radiated signals to permit distinguishing said second indicating surfaces from said guiding equi-signal surfaces.

WILLIAM J. O'BRIEN.